UNITED STATES PATENT OFFICE.

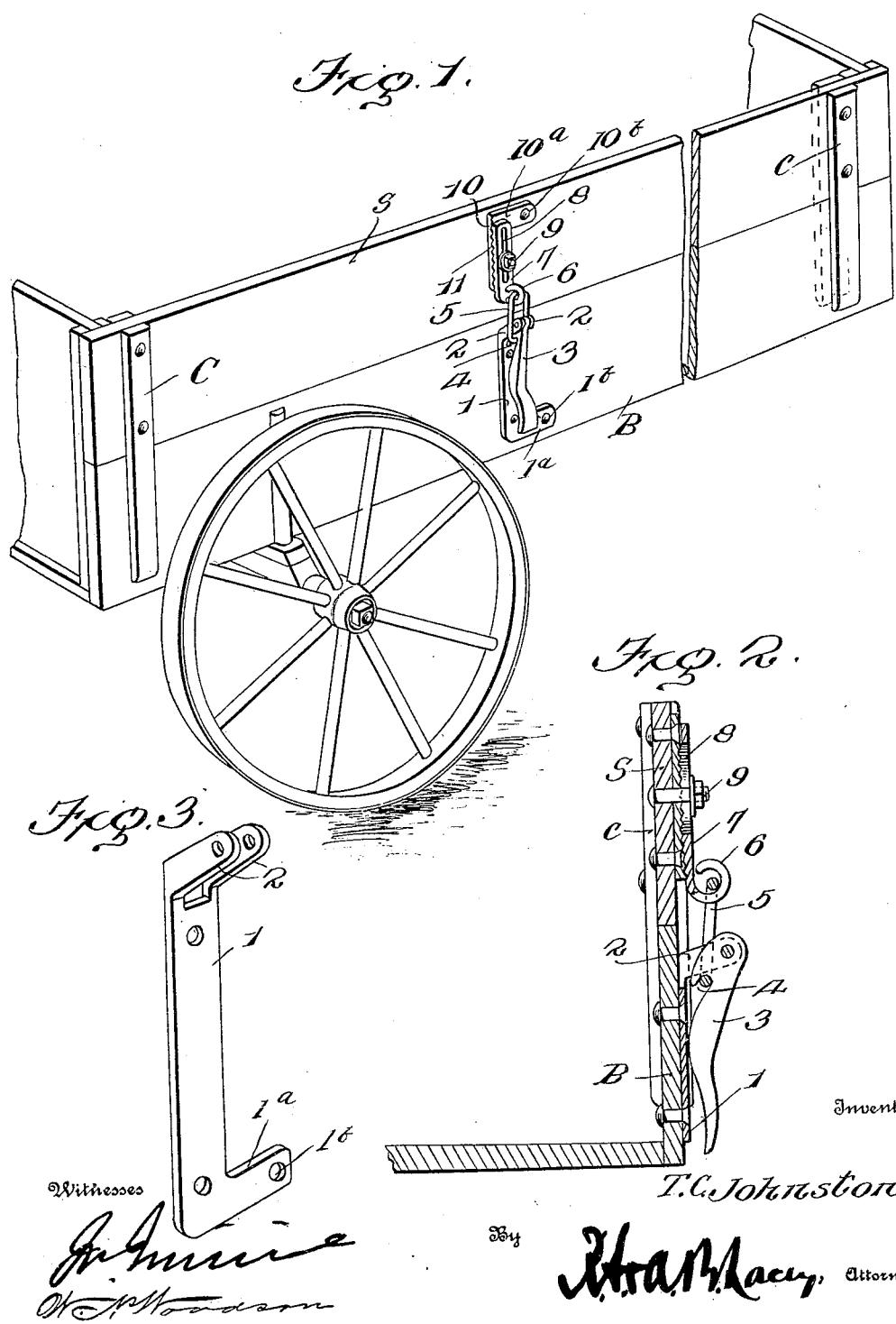

THOMAS C. JOHNSTON, OF MONTICELLO, ILLINOIS.

SIDE-BOARD CLAMP.

979,309.  Specification of Letters Patent.  Patented Dec. 20, 1910.

Application filed December 30, 1908. Serial No. 469,940.

*To all whom it may concern:*

Be it known that I, THOMAS C. JOHNSTON, citizen of the United States, residing at Monticello, in the county of Piatt and State of Illinois, have invented certain new and useful Improvements in Side-Board Clamps, of which the following is a specification.

This invention comprehends certain new and useful improvements in attachments for vehicles, and relates particularly to clamps for securing a side-board to the box of a wagon.

The invention has for its object a simple, durable and efficient construction of device of this kind which is composed of comparatively few parts which may be cheaply manufactured and easily assembled, and the invention consists of certain constructions and arrangements of parts that I shall hereinafter fully describe and claim.

For a full understanding of the invention reference is to be had to the following description and accompanying drawings, in which:—

Figure 1 is a perspective view of a portion of a wagon box constructed in accordance with my invention. Fig. 2 is a transverse sectional view thereof on an enlarged scale and, Fig. 3 is a detail perspective view of the lever plate.

Corresponding and like parts are referred to in the following description and indicated in all the views of the drawings by the same reference characters.

Referring to the drawings, the letter B designates a portion of a wagon box, and S a side-board which is designed to rest upon the box, the side-board being provided with the ordinary cleats C or similar devices.

My improved clamping device comprises one or more plates 1 that are secured to the sides of the wagon box B by bolts or similar fastening devices, each plate being formed at its upper end with outstanding ears 2 separated from each other. A lever 3 is fulcrumed at one end between said ears to swing in a vertical plane, said lever being formed at its pivot end with a recess or socket 4 designed to receive one end of a link 5. The link 5 is pivotally mounted in an eye 6 on the lower extremity of an extension bar 7 and is adapted to embrace the ears 2, said bar being formed with a longitudinally extending slot 8, which receives a threaded stud 9 formed on or secured to the outer face of a base-bar 10, the said bar being secured to the side-board S in any desired way. A nut is screwed upon the stud 9, preferably back of a washer, as shown. This clamps the two parts together after they have been adjusted relatively to each other and preferably the contacting faces of the parts are serrated or roughened as indicated at 11 to assist in effecting a secure connection.

The recess 4 in the operating lever is upwardly inclined and opens through that side of the lever next to the wagon box, said recess defining an overhanging hook adapted to engage the adjacent end of the link 5.

It will here be noted that the intermediate portion of the lever 3 is provided with an enlargement adapted to bear against the lower plate when said lever is swung downwardly, the free end of the lever being offset so as to provide a terminal handle, the inner face of which is spaced from the lower plate when the upper and lower plates are drawn together so as to permit the operator to readily grasp the handle when it is desired to separate the plates to effect the removal of the side board. It will also be noted that the lower plate forms a closure for the recess in the lever 3 when the latter is operated to draw the upper and lower plates together.

In the practical use of my improved sideboard clamps, the free end of the link 5 is slipped over the end of the lever 3 and inserted in the socket 4, and the lever 3 is then swung downwardly and inwardly against the plate 1, snapping past the center and securely locking the side-board firmly in place. The arrangement of bars 7 and 10, before described, makes provision for the proper adjustment of the link to secure the tension upon the same necessary for securely holding the side-board down upon the wagon box.

The plate 1 is formed with a laterally extending attaching arm 1$^a$ formed with an opening 1$^b$, and the base-bar 10, which is secured to the side board, is provided with a corresponding attaching arm 10$^a$ in which an opening 10$^b$ is formed. These openings 1$^b$ and 10$^b$ are for the purpose of receiving eye-bolts of cross-chains to keep the box from spreading when loaded.

Having thus described the invention, what is claimed as new is:—

A clamp comprising upper and lower plates for attachment to a side board and wagon box respectively, the upper plate being serrated and the lower plate provided with spaced laterally extending ears, a serrated auxiliary plate engaging the upper plate and having its intermediate portion provided with a vertically disposed slot and its lower end provided with an eye, a link suspended from said eye and embracing the ears, a fastening device extending through the sideboard and slot in the auxiliary plate and engaging the upper plate for holding the auxiliary plate in adjusted position, and an operating lever pivotally mounted between the ears and having its intermediate portion provided with an enlargement adapted to bear against the lower plate and its free end offset to form a terminal handle, the pivoted end of the operating lever being provided with an upwardly inclined recess opening through that side of the lever next to the wagon box and defining an overhanging hook adapted to engage the adjacent end of the link, the lower plate forming a closure for the recess in the lever when the latter is operated to draw the upper and lower plates together.

In testimony whereof I affix my signature in presence of two witnesses.

THOMAS C. JOHNSTON. [L. S.]

Witnesses:
MILTON MITCHELL,
B. F. MITCHELL.